United States Patent [19]
Coulon

[11] Patent Number: 5,383,985
[45] Date of Patent: Jan. 24, 1995

[54] METHOD OF INSTALLING AN INSERT SERVING AS A PROTECTIVE CLADDING ON A PART MADE OF MARTENSITIC STEEL OR OF TITANIUM-BASED ALLOY

[75] Inventor: André Coulon, Bessoncourt, France

[73] Assignee: GEC Alsthom Electromecanique SA, Paris, France

[21] Appl. No.: 70,925

[22] Filed: Jun. 4, 1993

[30] Foreign Application Priority Data

Jun. 5, 1992 [FR] France ................ 92 06860

[51] Int. Cl.6 .................................. B32B 31/12
[52] U.S. Cl. ................................ 148/527; 148/530; 148/532; 228/194
[58] Field of Search .................. 198/527–532, 198/535, 536; 228/194, 242

[56] References Cited

U.S. PATENT DOCUMENTS

| 3,952,939 | 4/1976 | Schilling et al. | 228/237 |
| 4,606,778 | 8/1986 | Jahnke | 148/529 |
| 4,611,752 | 9/1986 | Jahnke | 228/194 |
| 4,817,858 | 4/1989 | Verpoort | 148/527 |

FOREIGN PATENT DOCUMENTS

| 0123702 | 11/1984 | European Pat. Off. |
| 0171230 | 2/1986 | European Pat. Off. |
| 119514 | 4/1957 | France |
| 1268949 | 6/1961 | France |
| 2042393 | 9/1980 | United Kingdom |

Primary Examiner—George Wyszomierski
Attorney, Agent, or Firm—Sughrue, Mion, Zinn, Macpeak & Seas

[57] ABSTRACT

An intermediate layer (3) constituted essentially by one or more of the following metals: Ni, Cu, Ti, and Al is interposed between the insert (2) and the part (1) to be clad, e.g. a vane for a steam turbine. After the part and insert assembly has been calibrated in an isothermal matrix, it is inserted in an isostatic pressing oven and raised to a temperature that is lower than the melting temperature of the layer (3) but higher than the forging temperature of the part. This method makes it possible to retain the metallurgical properties of the part.

12 Claims, 1 Drawing Sheet

METHOD OF INSTALLING AN INSERT SERVING AS A PROTECTIVE CLADDING ON A PART MADE OF MARTENSITIC STEEL OR OF TITANIUM-BASED ALLOY

The present invention relates to a method of installing an insert serving as a protective cladding on a part made of martensitic steel or of titanium alloy.

Such cladding is designed to reduce wear in operation.

The parts in question may be parts of power machines such as turbines, and they may constitute elements of major importance because of their function, the stresses to which they are subjected, and their cost.

By way of non-limiting example, mention may be made of the moving vanes in a turbine which are damaged in operation by abrasion, erosion, or corrosion.

It is therefore essential to protect critical locations of such vanes to ensure prolonged survival of such parts.

A conventional way of making a part of this type is precision forging using special tooling referred to as a forming matrix, and constituting a genuine negative in two portions of the part to be forged, which portions come into contact under pressure from a stamp or a press and close on a blank that has previously been brought to an appropriate temperature. When manufacturing components of a shape that is as complex as a turbine vane, several items of tooling are required in succession:

firstly a forming matrix: the outline of the vane is formed; then a twisting matrix, if the vane is twisted; and finally a calibrating matrix.

Another conventional manufacturing technique is casting, which differs from forging only in that the shaping matrix is now a mold and the blank is material in the liquid state that is cast into the mold.

In the present conventional technique, the protective insert is made independently from the vane to which it is subsequently fixed. The insert may be machined out of a block of forged or cast material and then after being fitted to the leading edge of the vane it is brazed or welded thereto.

The insert is made of a hard material: an alloy based on cobalt, a two-phase alloy based on carbides (chromium, tungsten, titanium, etc. . . .) mixed with a matrix.

A recent technique of the above type is the hot isostatic pressing (HIP) method which makes use of powder metallurgy, where powder in the form of the insert is encapsulated and then subjected to isostatic pressure in an oven at high temperature under a determined atmosphere serving to transform the powder into a hot pressed bar, plate, etc. . . .

The process of fixing the insert on the part gives rise to defects in uniformity at boundaries: between the insert and the part when welding is used; and when brazing is used, both between the foil and the insert and between the foil and the part.

Heat treatment then needs to be applied to cause such defects to disappear, but the drawback of heat treatment is that it causes the part to lose its metallurgical properties.

The method of the invention avoids the above drawback and is characterized in that a metal layer is interposed between the insert and the part, which layer is constituted by elements that are compatible with the part and suitable for generating intermetallic phase components during heat treatment, in particular hot isostatic pressing (HIP), the melting temperature of said layer being 20° C. to 50° C. greater than the pressing temperature $\theta$ used, the assembly comprising the part and the insert is heated to a forging temperature that is at least 20° C. less than $\theta$, the part-insert assembly is inserted in a heated calibration matrix, the part-insert assembly is calibrated, the part-insert assembly is removed from the matrix, and it is cooled;

the part-insert assembly is inserted in an isostatic pressure oven and the assembly is compacted to a pressure greater than 1,000 bars at the temperature $\theta$, after which the assembly is cooled to ambient temperature.

All that is then required is to machine the part together with its insert to obtain the final shape.

When the part to be clad is made of martensitic steel, the foil may be constituted by pure copper, by nickel with indium, or by nickel with tin. It may also be constituted by an alloy of two or three of the following elements: Ni, Cu, and Al, and preferably 70% Ni, 15% Cu, 15% Al.

When the part is made of titanium alloy, the foil is constituted by titanium with indium, or by an alloy of two or three of the following elements: Ni, Ti, and Al, and preferably 50% Al, 25% Ni, 25% Ti.

BRIEF DESCRIPTION OF THE DRAWINGS

The invention is now described in greater detail with reference to a particular embodiment given by way of example and shown in the accompanying drawing.

DETAILED DESCRIPTION OF THE INVENTION

The part is constituted in this case by a turbine vane that has been obtained by forging or by casting, and an insert 2 that has been obtained by any conventional method, machining from a block of material, forging, casting, or even hot isostatic pressing. When HIP is used, the powder is encapsulated to have the shape of the insert 2 and it is subjected to isothermal pressure in a high temperature oven to transform the powder into a bar, a plate, etc. . . . by hot pressing.

The insert 2 has not yet received its finishing pass.

The outline of the insert 2 is trimmed and the angle between the outline and the surface of the insert 2 that is to remain visible is dulled and rounded by grinding.

A foil 3 having a minimum thickness of 1/10 mm and a maximum thickness of 3/10 mm and suitable for performing high temperature brazing is cut out so as to project by 3 mm to 5 mm relative to the outline of the insert 2.

When the turbine vane is made of martensitic steel, the foil 3 is constituted either by pure copper, or by nickel with indium, or by nickel with tin.

It may also be constituted by an alloy of two or three of the following elements: Ni, Cu, Al (with or without indium or tin being added).

When the vane is of titanium alloy, the foil 3 is constituted by titanium with indium or by an alloy of two or three of the following elements: Ni, Ti, Al.

The foil 3 is placed beneath the insert 2 and is tacked in place electrically by spot welds 4 (one spot every 50 mm).

Figure 1:
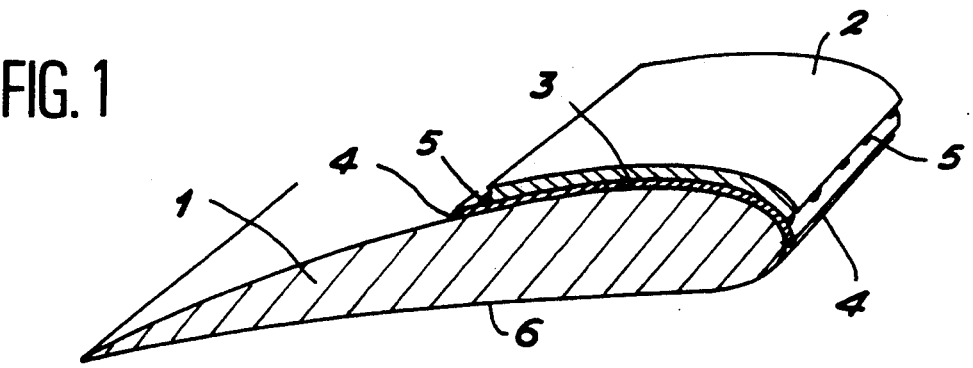
FIG. 1 shows a turbine vane provided with its insert.
Figure 2:
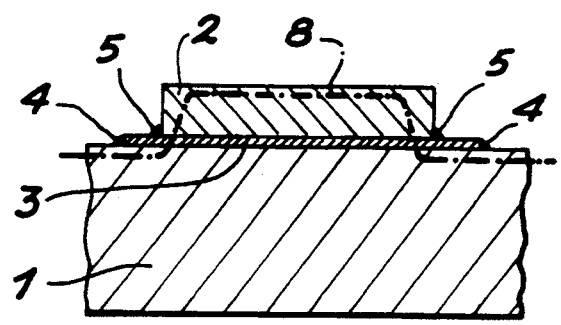
FIG. 2 is a section through FIG. 1.
Figure 3:
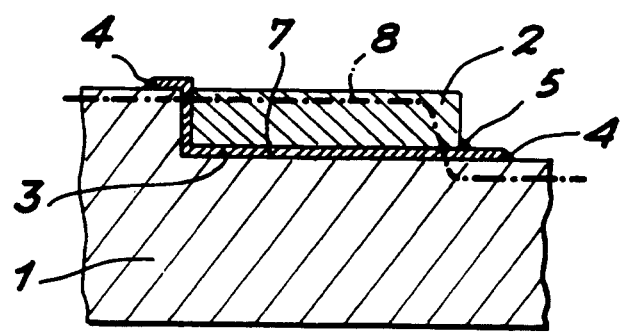
FIG. 3 shows a variant of FIG. 2.

The assembly comprising the insert 2 and the foil 3 is installed on the part 1 (e.g. a turbine vane) and is likewise electrically tacked by spot welds 5 (one spot 5 every 50 mm alternating with the weld spots 4 between the insert 2 and the foil 3). The assembled insert 2 and foil 3 may stand proud (FIGS. 1 and 2) or it may be received in a recess in the part.

The assembly 6 comprising the part and the insert is loaded into an oven and taken to forging temperature, and it is placed in an isothermal calibrating matrix, i.e. a matrix that has been heated to a temperature that is slightly less than the forging temperature.

During calibration, the shape of the part 1 together with its insert 2 is slightly changed (with dimensions changing by less than 5%).

After calibration, the part 1, together with its insert 2, is removed from the matrix and is subjected to controlled cooling down to ambient temperature.

The part provided with its insert 2 is then placed vertically in a hot isostatic pressing (HIP) oven and is subjected to final pressing. Pressing parameters (pressure and temperature) are compatible with the materials used.

At the HIP temperature $\theta$, the foil 3 transforms into intermetallic phase components that diffuse into the metal of the insert 2 and into the metal of the part 1.

These intermetallic phases provide the quality of the bond.

The temperature $\theta$ of the isostatic pressing oven is selected to be at least 20° C. to 50° C. greater than the temperature of the calibration stage but at least 20° C. to 50° C. less than the melting temperature of the foil 3. The cooling cycle is identical to that used for calibration.

The pressure is selected to be greater than 1,000 bars.

After cooling, the projecting portion of the foil 3 that has not been integrated in the substrate is ground (machined by rectification) so as to obtain the final profile.

Two examples of pairs of materials are given below. The product in question is a large turbine vane whose leading edge is to be protected against the effects of erosion by droplets of water.

EXAMPLE 1

Base material: 12% Cr martensitic steel.
Insert material: cobalt base alloy (>60% Co).
Intermediate foil NiAlCu (70% Ni, 15% Cu, 15%, Al).
Foil melting point 1,250° C.
Forging (calibration) temperature 1,050° C.
HIP temperature 1,200° C.
HIP pressure 1,500 bars.

EXAMPLE 2

Base material: titanium alloy TA6V.
Insert material: two-phase material BetaTi+TiC.
Intermediate foil NiTiAl (50% Al, 25% Ni, 25% Ti).
Foil melting point 1,100° C.
Forging (calibration) temperature 970° C.
HIP temperature 1,050° C.
HIP pressure 1,800 bars.

Figure 4:
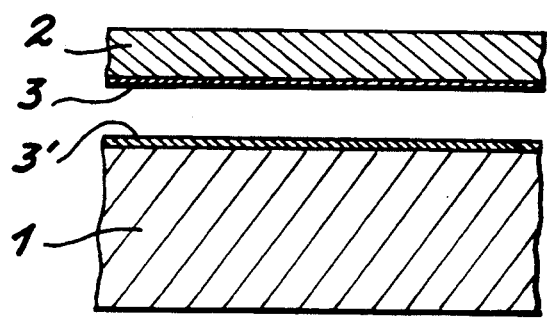
FIG. 4 shows a turbine vane together with its insert in a variant.

In a variant of the invention shown in FIG. 4, when the materials of the insert (2) and of the part (1) are completely incompatible, instead of using a single layer constituted by one foil, two layers 3 and 3' are used, one placed beneath the insert 2 and the other on the part 1. They may be deposited by sputtering; by ion evaporation; by electrodeposition; chemically; by means of a paint brush, etc. . . .

Thus, for placing a stellite insert on a titanium alloy vane, the layer 3 has one of the above-mentioned compositions that is compatible with titanium alloy.

The layer 3' has a composition that is compatible with martensitic steel, as mentioned above.

I claim:

1. A method of installing a coating serving as protective cladding, on a part made of a material selected from a group consisting of martensitic steel and titanium-based alloy, the method comprising the steps of:

interposing a metal layer between the, coating and the part, which layer is constituted by elements that transform into intermetallic phase components during heat treatment, the melting temperature of said layer being 20° C. to 50° C. greater than the temperature $\theta$ used for said heat treatment;

heating an assembly comprising the part and the coating to a forging temperature that is at least 20° C. less than $\theta$, inserting the part-coating assembly in a heated calibration matrix, calibrating the part-coating assembly removing the part-coating assembly from the matrix, and cooling the assembly; and inserting the part-coating assembly in an isostatic pressure oven, compacting the assembly to a pressure greater than 1,000 bars at the temperature $\theta$, and then cooling the assembly to ambient temperature.

2. The method according to claim 1, wherein said part is made of martensitic steel, and wherein the layer is a foil made of a material selected from a group consisting of pure copper, nickel with indium, and nickel with tin.

3. The method according to claim 1, wherein said part is made of martensitic steel, and wherein the layer is a foil made of an alloy of two or three elements selected from a group consisting of Ni, Cu and Al.

4. The method according to claim 3, wherein the alloy is constituted by 70% Ni, 15% Cu and 15% Al.

5. The method according to claim 1, wherein said part is made of titanium alloy, and wherein the layer is a foil constituted by titanium with indium.

6. The method according to claim 1, wherein said part is made of titanium alloy, and wherein the layer is a foil made of an alloy of two or three elements selected from a group consisting of Ni, Ti, and Al.

7. A method according to claim 6, characterized in that the alloy of the foil is constituted by 50% Al, 25% Ni, 25% Ti.

8. A method according to claim 1, characterized in that the layer projects beyond the coating.

9. The method according to claim 8, wherein the layer is a foil, and further comprising the steps of tacking the foil to the part and tacking the coating to the foil before the assembly is inserted in the calibration matrix.

10. The method according to claim 9, characterized in that the tacking steps are performed by spot welding which forms respective welding spots.

11. A method according to claim 10, characterized in that the spots tacking the coating to the foil are disposed between the spot tacking the foil to the part.

12. The method according to claim 1, wherein said coating is steel, said part is made of titanium-based alloy, said metal layer is made of a material selected from a group consisting of titanium with indium, and an alloy of two or three elements selected from a group consisting of Ni, Ti, and Al, and further comprising the steps of: depositing an intermediate layer beneath the coating, said intermediate layer being made of a material selected from a group consisting of pure copper, nickel with indium, nickel with tin, and an alloy of two or three elements selected from a group consisting of Ni, Cu, and Al, depositing said metal layer on the part, and assembling together the metal layer, the intermediate layer, the part, and the coating, prior to said heating step.

* * * * *